United States Patent [19]

Rassmann et al.

[11] Patent Number: 4,787,501
[45] Date of Patent: Nov. 29, 1988

[54] CONNECTIONS FOR SCRAPER-CHAIN CONVEYORS

[75] Inventors: Christoph Rassmann; Peter Lindenau; Bernd Steinkuhl, all of Lünen; Horst Schlüsener, Werne, all of Fed. Rep. of Germany

[73] Assignee: Gewerkschaft Eisenhutte Westfalia GmbH, Lünen, Fed. Rep. of Germany

[21] Appl. No.: 93,261

[22] Filed: Sep. 4, 1987

[30] Foreign Application Priority Data

Sep. 6, 1986 [DE] Fed. Rep. of Germany ....... 3630450

[51] Int. Cl.⁴ .............................................. B65G 19/28
[52] U.S. Cl. .................................................. 198/735
[58] Field of Search ............................. 198/735, 860.3

[56] References Cited

U.S. PATENT DOCUMENTS 4,484,677 11/1984 Berwald .............................. 198/735
4,735,304 4/1988 Schoop et al. ...................... 198/735

FOREIGN PATENT DOCUMENTS 2177993 2/1987 United Kingdom ................ 198/735

Primary Examiner—Joseph E. Valenza
Attorney, Agent, or Firm—Sughrue, Mion, Zinn, Macpeak and Seas

[57] ABSTRACT

To firmly connect an upper trough-like component of a scraper-chain conveyor to a lower component use is made of arch-like locking pieces which fit on a side plate of the lower component which overlaps the side wall of the upper component. The upper regions of the locking pieces having inwardly projecting noses which fit into apertures in the side plate and side wall. Sockets are formed in projections on the side plate to receive the heads of screw-threaded securing elements which locate in recesses in the locking pieces and project through holes in side walls thereof. The securing elements adopt an inclined disposition and when nuts are tightened on their shanks the locking pieces tend to force and hold the upper component down on the lower component.

12 Claims, 2 Drawing Sheets

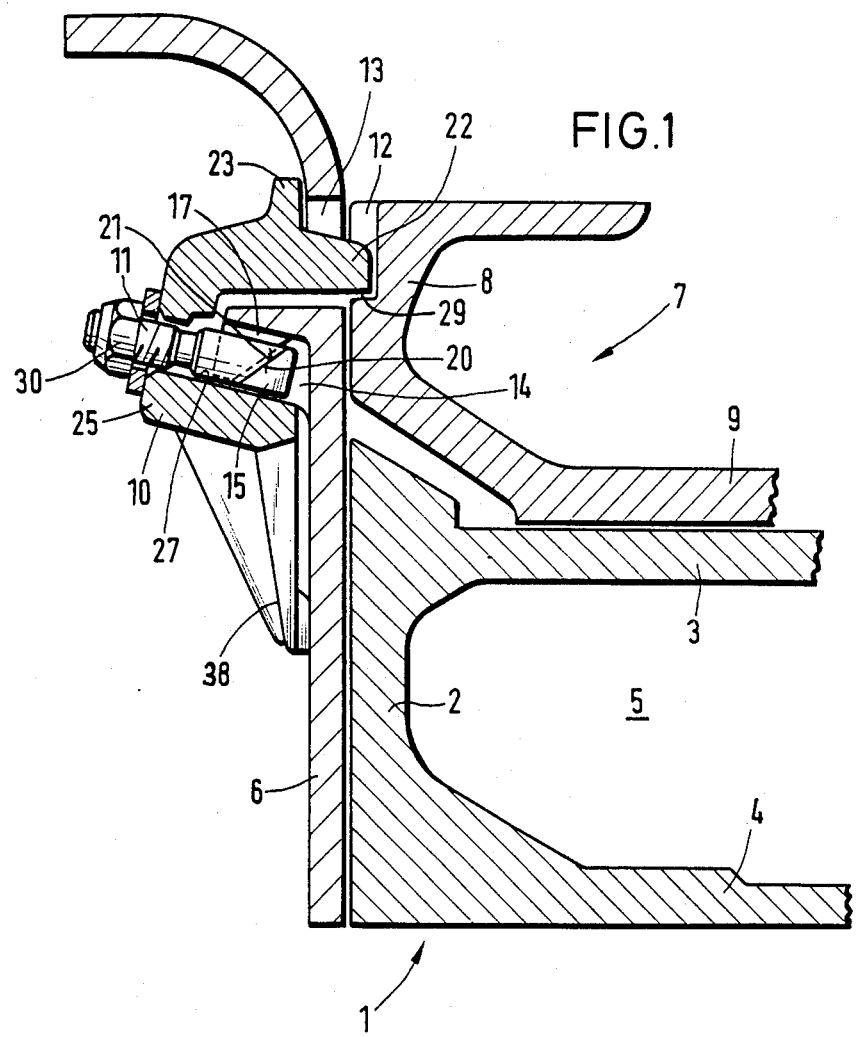

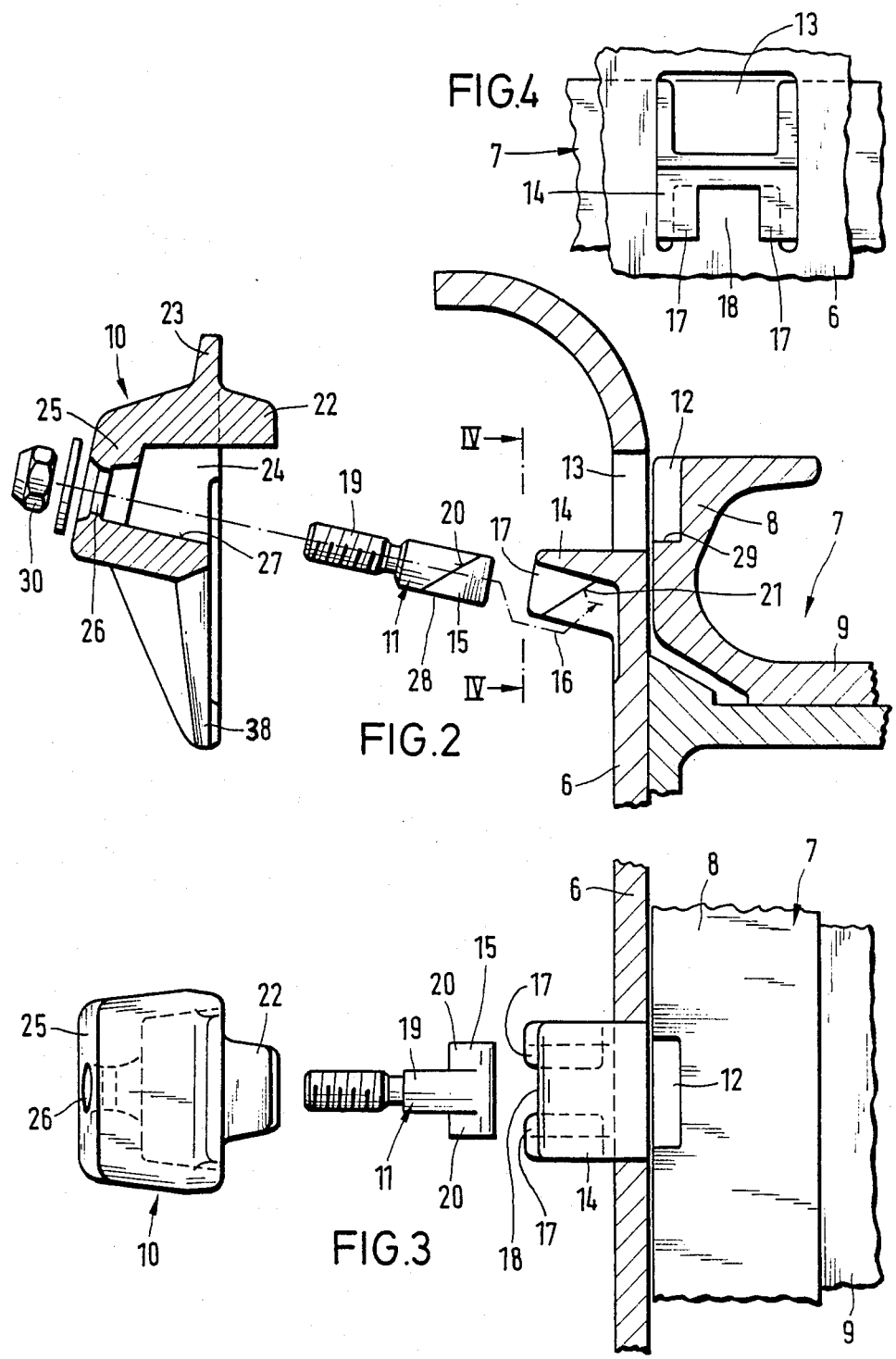

CONNECTIONS FOR SCRAPER-CHAIN CONVEYORS

BACKGROUND TO THE INVENTION

1. Technical Field of the Invention

The present invention relates in general to scraper-chain conveyors as used in mineral mining. More particularly, the invention is concerned with connection means for connecting upper and lower components of the individual channel sections or pans of the conveyor.

2. Description of Prior Art

It is known to construct scraper-chain conveyors from individual channel sections or pans joined end-to-end and furthermore to construct each pan from upper and lower component structures which are releasably connected together. Normally the upper components of the pans form open troughs which need replacement from time to time. To interconnect the upper and lower components it is known to provide the lower components with upstanding side plates, side walls or equivalent side fittings and to connect these side plates or fittings to the side walls of the upper components with bolts. One known form of connecting device is described in German Utility Model 8501161.

A general object of the invention is to provide an improved connection means for the purpose set forth.

SUMMARY OF THE INVENTION

A connection constructed in accordance with the invention comprises a side plate or equivalent fixed or connected to one of the side walls of a lower component of a conveyor pan and projecting alongside a side wall of an associated upper component, apertures in said associated side wall of the upper component having base surfaces, locking members having upper regions provided with projecting noses received within the apertures to engage with the base surfaces, means on the side plate defining sockets, fixing elements with screw-threaded shanks and heads, the heads of the fixing element being located by the sockets with complementary guide surfaces of the heads of the elements and within the socket engaging one another and recesses in the locking members receiving and locating the fixing elements and presenting their shanks to receive nuts which can be tightened to clamp the upper component firmly down onto the lower component.

The sockets are defined by means on the side plate or its structural equivalent which project outwardly beyond the main outer side face of the plate. These sockets are conveniently open from beneath but otherwise substantially closed except for access for the shanks of the fixing elements. The fixing elements, which may be T-shaped preferably have wedge-like inclined surfaces on the wings of their heads which engage with similiar surfaces in the sockets. The head or some other part of each fixing element preferably supports itself on an inclined lower surface in the recess of the associated locking member or piece. The inclination of the support surfaces in the recesses is opposite to that of the inclined surfaces in the sockets so that as the nuts are tightened onto the threaded shanks the locking pieces urge the noses against the base surfaces of the apertures in the upper component side wall to hold the upper component tightly on the lower component.

Conveniently, depending flanges on the locking pieces support themselves on the side plate as do upstanding ribs on the upper regions thereof. Where the side plate projects beyond the upper component it is advisable to provide window-like openings in the side plate which align with the apertures in the upper component side wall. The ribs then screen or cover these openings.

The invention may be understood more readily, and various other aspects and features of the invention may become apparent, from consideration of the following description.

BRIEF DESCRIPTION OF DRAWINGS

An embodiment of the invention will now be described, by way of example only, with reference to the accompanying drawings, wherein:

FIG. 1 is a sectional view of part of a conveyor channel section employing connection means in accordance with the invention;

FIG. 2 is a sectional exploded view of the connection means shown in FIG. 1;

FIG. 3 is a part-sectional exploded plan view of the connection means; and

FIG. 4 is an elevation of part of the connection means, the view being taken in the direction of arrow IV in FIG. 2.

DESCRIPTION OF PREFERRED EMBODIMENT

As is known per se, a scraper-chain conveyor is composed of a series of channel sections or pans joined end-to-end and along which a scraper-chain assembly is circulated to transfer material. The individual channel sections are each composed of an upper component releasably connected to a lower component. In the accompanying drawings only part of these components and of the channel section is illustrated and the general construction is similiar to that described in German Utility Model No. 8501161. As shown in FIG. 1, a lower component 1 of the pan is composed of a pair of side walls 2 rigidly interconnected by a floor plate 3 and by a base cover plate 4 to form a hollow structure. The upper component 7 is of trough-like form composed of a pair of side walls 8 rigidly interconnected by a floor plate 9 which is superimposed on the floor plate 3. Although only one wall 2,8 is shown in FIG. 1 the opposite wall is in mirror image to the illustrated wall 2,8. The respective pairs of walls 2 and 8 need not be identical—especially if one of the walls has other structure thereon such as a plough guide. The interior of the walls 2, the undersurface of the floor plate 3 and the upper surface of the cover plate 4 collectively define a lower guide passage 5 through which the return run of the scraperchain assembly (not shown) passes. The interior of the walls 8 and the upper surface of the floor plate 9 define an upper guide passage through which the haulage run of the scraper-chain assembly passes.

The upper component 7 is normally subjected to heavier wear than the lower component 1 and would require replacing from time to time. The components 1, 7 are detachably interconnected by connection means as will now be described.

A side plate 6 or equivalent is fixed or connected to the exterior of at least one of the side walls 2, preferably that on the goaf side remote from the mineral face. As illustrated, the upper region of the plate 6 is bent outwardly as a curve. The side plate 6 can be made integrally as one-piece with the associated side wall 2 or separately. The plate 6 projects upwardly beyond the wall 2 and the floor plate 3 to overlap the exterior of the associated side wall 8 of the upper component 7. The connection means serves to connect the side plate 6 to the side wall 8, and as illustrated the connection means is in the form of locking pieces 10 of arch-like configuration and screw-threaded fixing elements 11 with associated nuts 30 and washers. Similiar connection means can be provided on the opposite side of the components 1, 7 with another side plate 6 there also. The side wall 8 of the upper component 7 is relieved at its upper region to provide recesses 12 open from above with base surfaces 29. The side plate 6 is provided with window-like apertures 13 which align with the recesses 12. Beneath each aperture 13 there is an outwardly projecting portion 14 which provides a socket for receiving one of the fixing elements 11. The socket defined by each portion 14 is closed from the sides and from above with wall regions but is open from the underside of the portion 14 to permit the head 15 of the fixing element 11 to be introduced from below as indicated by the chain-dotted arrow line 16 in FIG. 2. The socket has a laterally outward opening 18 through which a boss of the shank 19 of the fixing element 11 passes. As shown in FIG. 3, the fixing element 11 is somewhat T-shaped in plan view and the outer region of the shank 19 is provided with a screw-thread. The head 15 has wing-like wedge shaped regions with surfaces 20 which incline outwardly and downwardly. The socket in the portion 14 has side wall margins 17 with correspondingly shaped inclined surfaces 21 which abut the surfaces 20 of the head 15.

The locking members 10 each have a protruding nose 22 and an upstanding rib 23 on its upper region. A recess 24 is formed beneath the upper region and is open towards the side plate 6. The locking member 10 also has a depending support flange 38 which engages on the side plate 6 as shown in FIG. 1. As shown in FIG. 1, the recess 24 receives one of the socket-forming portions 14 of the side plate 6. The recess 24 also communicates with a hole 26 in an outer wall 25 of the locking piece 10 and the threaded part of the shank 19 of the fixing element 11 engages through the hole 26. The recess 24 is defined by a lower inclined face 27 which abuts, supports and guides an undersurface 28 of the element 11. The face 27 inclines in the opposite direction to the surfaces 20, 21. When the element 11 is located in position it is angularly inclined relative to the floor plate 9, 3.

To secure the upper trough component 7 to the lower component 7 of the pan the fixing elements 11 are inserted into the sockets of the portions 14 to bring their faces 20 into engagement with the faces 21. The locking pieces 10 are then fitted onto the elements 11 to bring the shanks 19 of the latter through the holes 26. The noses 22 fit in the window-like apertures 13 and the recesses 12 and engage with their undersurface on the base surfaces 29 of the recesses 12. Nuts 30 are screwed onto the protruding shanks 19 of the elements 11 with interposed washers and as the nuts 30 are tightened the engagement between the faces 20, 21 and 27, 28 subjects the locking pieces 10 to downwardly directed forces to bring the noses 22 firmly against the base surfaces 29. This holds the upper trough component 7 firmly down on the lower component 1. The flanges 38 of the locking pieces 10 ensure the locking pieces 10 are themselves supported on the side plate 6. The ribs 23 screen the openings 13 and also engage the side plate 6.

We claim:

1. In a channel section for a scraperchain conveyor which is composed of upper and lower components (1, 7) each having a pair of interconnected side walls (2, 8); an improved means for detachably connecting the components together, said connecting means comprising: a side plate (6) fixed to one of the side walls of the lower component and projecting alongside an associated side wall of the upper component, recesses (12) defined in said associated side wall of the upper component, said recesses having base surfaces (29), locking members (10) having upper regions provided with projecting noses (22) received within the recesses to engage with the base surfaces, means (14) on the side plate defining sockets, fixing elements (11) with screw-threaded shanks (19) and heads (15), the heads of the fixing elements being located by the sockets with complementary surfaces (20, 21) of the heads of the elements and within the socket engaging one another, apertures (24, 26) in the locking members receiving and locating the fixing elements and presenting their shanks to receive nuts (30) which can be tightened to clamp the upper component firmly down onto the lower component, wherein each locking member has a depending flange (38) which supports itself against the side plate.

2. Connection means according to claim 1, wherein the fixing elements are generally T-shaped and the heads of the fixing elements have inclined surfaces (20) for engaging inclined complementary surfaces (21) in the sockets.

3. Connection means according to claim 2, wherein surfaces (28) of parts of the fixing elements engage with inclined lower surfaces (27) of the apertures.

4. Connection means according to claim 1, wherein the sockets are each closed from both sides and from above, but are open from beneath, and the heads of the fixing element are locatable into the sockets from beneath.

5. Connection means according to claim 1, wherein the aperture in each locking member defines a hole (26) in a wall (25) opposite the side plate and the shank of the associated fixing element passes through said hole.

6. Connection means according to claim 1, wherein the side plate has window-like openings (13) aligned with the recesses in the side wall.

7. Connection means according to claim 3, wherein the inclined lower surfaces of the apertures incline in the opposite direction to the inclined surfaces of the sockets.

8. Connection means according to claim 1, wherein the upper regions of the locking members are also provided with upstanding ribs (23).

9. Connection means according to claim 8, wherein said ribs also engage the side plate.

10. Connection means according to claim 1, wherein the apertures of the locking members also receive the socket-defining means.

11. In a channel section for a scraper-chain conveyor which is composed of upper and lower components (1, 7) each having a pair of interconnected side walls (2, 8); an improved means for detachably connecting the components together, said connecting means comprising: a side plate (6) fixed to one of the side walls of the lower component and projecting alongside an associated side wall of the upper component, recesses (12) defined in said associated side wall of the upper component, said recesses having base surfaces (29), locking members (10) having upper regions provided with projecting noses (22) received within the recesses to engage with the base surfaces, means (14) on the side plate defining sockets, fixing elements (11) with screw-threaded shanks (19) and heads (15), the heads of the fixing elements being located by the sockets with complementary surfaces (20, 21) of the heads of the elements and within the socket engaging one another, apertures (24, 26) in the locking members receiving and locating the fixing elements and presenting their shanks to receive nuts (30) which can be tightened to clamp the upper component firmly down onto the lower component, wherein the fixing elements are generally T-shaped and the heads of the fixing elements have inclined surfaces (20) for engaging inclined complementary surfaces (21) in the sockets, wherein surfaces (28) of parts of the fixing elements engage with inclined lower surfaces (27) of the apertures, and wherein the inclined lower surfaces of the apertures incline in the opposite direction to the inclined surfaces of the sockets.

12. In a channel section for a scraper-chain conveyor which is composed of upper and lower components (1, 7) each having a pair of interconnected side walls (2, 8); an improved means for detachably connecting the components together, said connecting means comprising: a side plate (6) fixed to one of the side walls of the lower component and projecting alongside an associated side wall of the upper component, recesses (12) defined in said associated side wall of the upper component, said recesses having base surfaces (29), locking members (10) having upper regions provided with projecting noses (22) received within the recesses to engage with the base surfaces, means (14) on the side plate defining sockets, fixing elements (11) with screwthreaded shanks (19) and heads (15), the heads of the fixing elements being located by the sockets with complementary surfaces (20, 21) of the heads of the elements and within the socket engaging one another, apertures (24, 26) in the locking members receiving and locating the fixing elements and presenting their shanks to receive nuts (30) which can be tightened to clamp the upper component firmly down onto the lower component, wherein the apertures of the locking members also receive the socket-defining means.

* * * * *